United States Patent [19]

Sakurai

[11] Patent Number: 5,718,120
[45] Date of Patent: Feb. 17, 1998

[54] VEHICLE AIR-CONDITIONING SYSTEM AND CONTROL METHOD

[75] Inventor: Yoshihiko Sakurai, Ohsato-gun, Japan

[73] Assignee: Zexel Corporation, Tokyo, Japan

[21] Appl. No.: 754,957

[22] Filed: Nov. 22, 1996

[30] Foreign Application Priority Data

Nov. 30, 1995 [JP] Japan ................................. 7-334308

[51] Int. Cl.$^6$ .................................................. B60H 1/00
[52] U.S. Cl. ........................... 62/126; 62/163; 62/131; 165/204
[58] Field of Search ................................ 62/180, 125, 126, 62/127, 129, 244, 161, 163, 186, 131; 165/202, 203, 204

[56] References Cited

U.S. PATENT DOCUMENTS

| 4,688,389 | 8/1987 | Iida ................................ 62/163 X |
| 4,762,169 | 8/1988 | Andersen et al. .................. 165/204 X |
| 5,230,467 | 7/1993 | Kubsch et al. ..................... 62/127 X |
| 5,259,211 | 11/1993 | Ikeda ............................. 62/163 X |

FOREIGN PATENT DOCUMENTS

| 2-197444 | 8/1990 | Japan . |
| 7-28967 | 7/1995 | Japan . |

*Primary Examiner*—Harry B. Tanner
*Attorney, Agent, or Firm*—Pollock, Vande Sande & Priddy

[57] ABSTRACT

A vehicle air-conditioning system which operates in response to the manipulation of momentary switches is provided with discriminating means for discriminating whether any momentary switch is on at the time of system power-up. When the discriminating means finds that one or more momentary switches are on, the vehicle air-conditioning system is set to a predefined initial control state independent of contact information from such momentary switch or switches. As a result, at least the minimum temperature control required for occupant comfort can be secured when shorted contact sticking occurs in a momentary switch provided on an operation panel.

12 Claims, 6 Drawing Sheets

FIG. 6

FROM STEP 43 →

CONPOSITE SIGNAL CALCULATION

$T = (Tr - 25) + K_A(T_{aD} - 25) + K_s \cdot Q_s$
$\quad - K_{SET}(T'_{SET} - 25) + C$ WHEN $40 < T_{aD}$     $T'_{SET} = T/S - 1.67$ WHEN $-5 \leq T_{aD} \leq 40$     $T'_{SET} = T/S - 0.11 T_{aD} + 3.33$ WHEN $-5 > T_{aD}$     $T'_{SET} = T/S + 3.33$

→ TO STEP 45

T/S : TEMP SETTING $T'_{SET}$ : TEMP SETTING CORRECTED FOR OUTSIDE TEMP $T_{aD}$ : OUTSIDE TEMP FOR CONTROL PURPOSES $Q_s$ : SUNLIGHT INTENSITY CORRECTION FACTOR

Tr : PASSENGER COMPARTMENT TEMP

C : COEFFICIENT $K_s$ : SUNLIGHT INTENSITY SENSOR GAIN $K_A$ : OUTSIDE AIR TEMP SENSOR GAIN $K_{SET}$ : TEMP SETTING GAIN

VEHICLE AIR-CONDITIONING SYSTEM AND CONTROL METHOD

BACKGROUND OF THE INVENTION

1. Field of the Invention

The present invention relates to a vehicle air-conditioning system and a method of controlling a vehicle air-conditioning system, more particularly to a vehicle air-conditioning system which conducts fail-safe control when the contacts of a momentary switch on an operation panel stick in shorted contact and a control method.

2. Prior Art

The momentary switch (a switch that is always open when not being pushed) which is widely used in the air-conditioner operation panels of vehicle air-conditioning systems frequently incurs shorted contact sticking, a malfunction in which the switch contacts remain closed in shorted contact even when the switch is not being depressed. Prior art techniques directed to overcoming this shorted contact sticking problem include that disclosed in Japanese Utility Model Publication No. Hei 7-28967 ('967), which teaches a system in which switch contact information is fetched based on a predetermined priority order when two or more switches are pressed simultaneously.

The system proposed by '967 is not effective in all situations, however. For example, in the case of a vehicle air-conditioning system in which momentary switches are used as the temperature increase switch (temp-up switch) and temperature decrease switch (temp-down switch) for changing the passenger compartment temperature setting indicated on a display provided on the operation panel, shorted contact sticking may in some models cause the set temperature to rise or fall continuously to the upper or lower limit temperature setting, after which further adjustment of the temperature setting becomes impossible. When the system of '967 is adopted to avoid this problem with, for instance, the temp-down switch assigned higher priority, the temperature setting can be lowered by use of the temp-down switch even if the contacts of the temp-up switch should stick, but after the temperature setting has been lowered and the switch is released, the temperature setting again rises.

Japanese Patent Application Public Disclosure No. Hei 2-197444 teaches an air-conditioning system which puts the air conditioner in automatic operation mode when a problem is found to have arisen in a multiplex transmission path provided between an operation unit and an electrical component. Since this prior-art system cannot discriminate switch contact sticking, however, it cannot be applied to overcome the shorted contact sticking problem. Also, while most vehicle air-conditioning systems are designed to restore the passenger compartment temperature setting to 25° C. by restoring the control unit to its initial setting when power is first supplied from the vehicle battery, this 25° C. setting immediately following connection with the battery cannot be maintained and rises to the maximum temperature (e.g., 32° C.) when contact sticking of the type discussed above has occurred.

SUMMARY OF THE INVENTION

One object of the present invention is to provide a vehicle air-conditioning system and a control method which overcome the aforesaid problems of the prior art.

Another object of the invention is to provide a vehicle air-conditioning system and a control method which can secure at least the minimum temperature control required for occupant comfort when shorted contact sticking occurs in a momentary switch for setting purposes provided on an operation panel.

Another object of the invention is to provide a vehicle air-conditioning system and a control method which can secure at least the minimum temperature condition required for occupant comfort when shorted contact sticking occurs in a momentary switch for setting passenger compartment temperature provided on the operation panel.

Another object of the invention is to provide a vehicle air-conditioning system and a control method which can secure at least the minimum required fan speed control when shorted contact sticking occurs in a momentary switch for setting fan speed provided on the operation panel.

Another object of the invention is to provide a vehicle air-conditioning system and a control method which can secure at least the minimum temperature condition required for occupant comfort when shorted contact sticking occurs in a momentary switch for setting air flow distribution mode provided on the operation panel.

Another object of the invention is to provide a vehicle air-conditioning system and a control method which can secure at least the minimum air flow distribution required for occupant comfort when contact sticking occurs in a momentary switch for setting air distribution mode provided on the operation panel.

For achieving these objects, this invention provides a vehicle air-conditioning system comprising an air conditioner operation panel equipped with one or more momentary switches, a control unit responsive to at least contact information from the momentary switches for outputting a control signal for air-conditioning control, a main air-conditioning system unit which operates in response to the control signal, discriminating means for discriminating whether or not any momentary switch is on at system power-up, and initialization means for setting the system to a predefined initial control state when the discriminating means discriminates that at least one momentary switch is on.

When the vehicle air-conditioning system is powered up by, for example, turn-on of the power switch of the control unit in response to the ignition switch of the vehicle being turned from the off position to the on position, the discriminating means discriminates whether any momentary switch provided on the operation panel is on at that time. If it is found that at least one momentary switch is on, the contact information from the switch or switches found to be on is invalidated and the initialization means sets the vehicle air-conditioning system to a predefined initial control state.

The discriminating means can be configured to carry out the discrimination with respect to all of the momentary switches or with respect to a specified one or more thereof. For instance, it can be configured to discriminate only the states of a temperature increase switch (temp-up switch) and a temperature decrease switch (temp-down switch) for setting the passenger compartment temperature. In this case, control of the passenger compartment temperature is set to the predefined initial control state when the temp-up switch and/or the temp-down switch incurs shorted contact sticking. The initial control state can be such that the passenger compartment temperature setting is shifted to near the middle of the range of settable temperatures or to a specific temperature such as 25° C.

The vehicle air-conditioning system can be configured so that when the discriminating means or some other means detects that the momentary switch or switches discriminated by the discriminating means to be on at power-up have since gone off, the predefined initial control state of the vehicle air-conditioning system is discontinued and the normally controlled operating state, i.e., the state in which contact information fetched from the momentary switches is used for control, is restored. When this configuration is adopted, the normal control state is restored if the contacts of the momentary switch or switches stick in shorted contact only temporarily and the switches or switches later return to the normal unstuck state.

Another aspect of the invention provides a method of controlling a vehicle air-conditioning system including a main air-conditioning system unit and an air-conditioner operation panel equipped with one or more momentary switches, wherein the main air-conditioning system unit is controlled by an air-conditioning control signal output in response to at least contact information from the momentary switches, the method comprising the steps of discriminating whether or not any momentary switch is on at system power-up and setting the system to a predefined initial control state independent of contact information from such momentary switch or switches when at least one momentary switch is discriminated to be on.

When the vehicle air-conditioning system cannot function properly owing to shorted contact sticking of one or more momentary switches, the invention enables an operation such as turning the vehicle ignition key off and back on to be used for controlling the operation of the vehicle air-conditioning system in an appropriate predefined initial state. The invention is particularly effective when applied to a vehicle air-conditioning system which uses momentary switches to permit the temperature setting to be varied continuously since it enables the inappropriate temperature control which would otherwise occur upon sticking of the momentary switch contacts in shorted contact to be avoided and a comfortable passenger compartment temperature to be maintained merely by turning the power supply off and then back on so as to establish a temperature setting of appropriate value.

The invention will be better understood and other objects and advantages thereof will be more apparent from the following detailed description of preferred embodiments with reference to the accompanying drawings.

BRIEF EXPLANATION OF THE DRAWINGS

FIG. 6 is a diagram for explaining processing conducted in the step of the flow chart of FIG. 3 for calculating a composite signal.

DETAILED DESCRIPTION OF THE PREFERRED EMBODIMENTS

Figure 1:
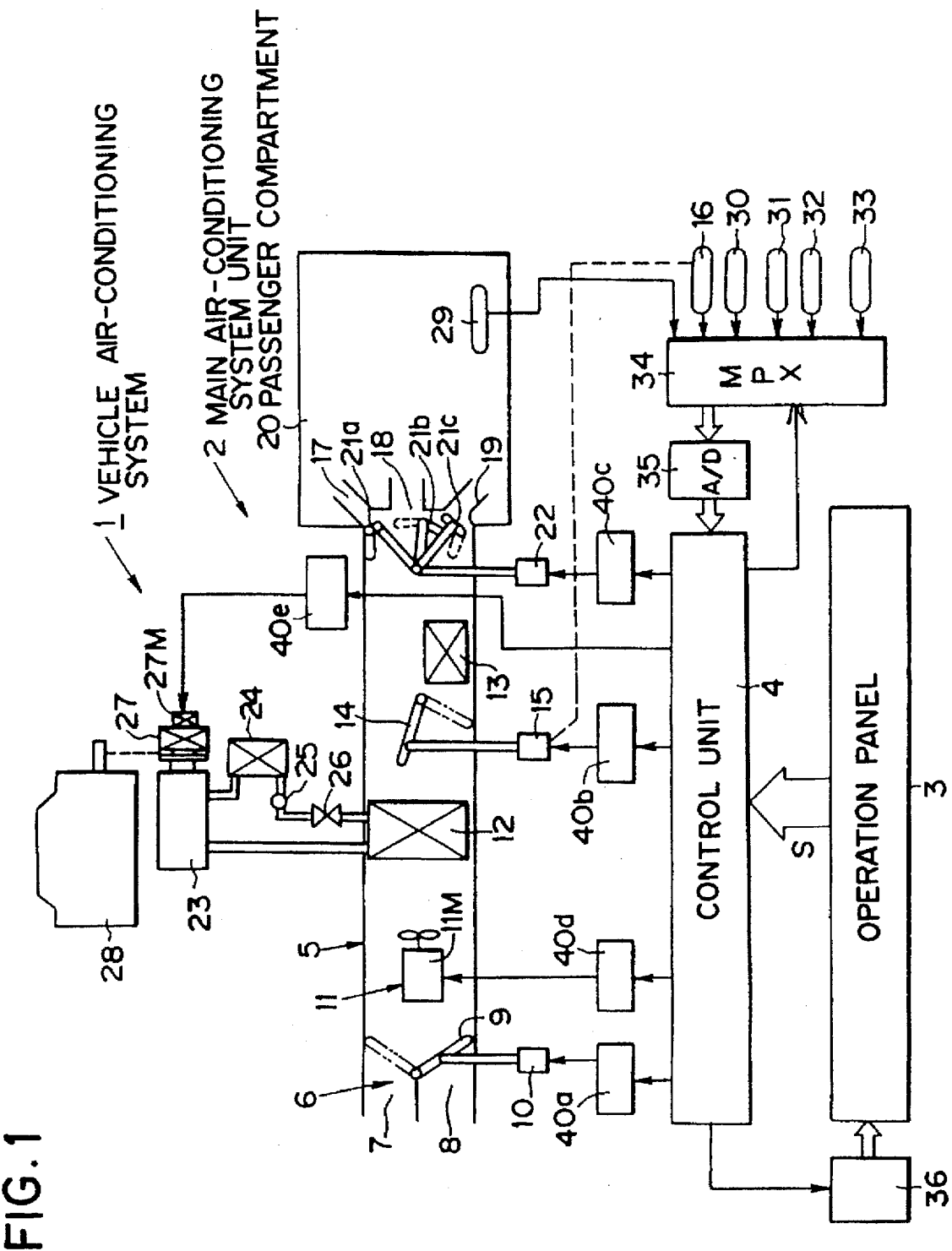
FIG. 1 is a block diagram of a vehicle air-conditioning system which is an embodiment of the invention.

FIG. 1 is a block diagram showing the general configuration of a vehicle air-conditioning system 1 which is an embodiment of the invention. The vehicle air-conditioning system 1 includes a main air-conditioning system unit 2, an operation panel 3 and a control unit 4 which outputs various control signals for controlling the main air-conditioning system unit 2 in response to operation switches and other operation members provided on the operation panel 3, sensor output information from various sensors (explained later) provided in the main air-conditioning system unit 2, and sensor output from other sensors.

The main air-conditioning system unit 2 has an air-conditioning duct 5 equipped at its upstream extremity with an intake switching device 6. The intake switching device 6 has an intake air selector door 9 installed at a point where the duct 5 is divided into an inside air intake 7 and an outside air intake 8. The desired air intake mode is established by operating an intake actuator 10 to selectively set the intake air selector door 9 so as to allow passage of either internal air (passenger compartment air) or external air into the duct 5.

A blower 11 is installed in the duct 5 for sucking air into the duct 5 and blowing it toward a downstream evaporator 12 and heater core 13. The degree of opening of an air mixing door 14 provided upstream of the heater core 13 is regulated by a mixing door actuator 15 so as to vary the amounts of air which pass through and bypass the heater core 13 thereby adjusting the temperature of the air blown into the passenger compartment 20. An air mixing door potentiometer 16 connected with the mixing door actuator 15 for detecting the position of the air mixing door 14 outputs a detected position signal indicating the position of the air mixing door 14.

The downstream end of the duct 5 branches and opens into the passenger compartment 20 through a defroster outlet 17, a vent outlet 18 and a floor outlet 19. Mode doors 21a, 21b and 21c installed in the branching region are operated by a mode door actuator 22 to set the desired air flow distribution mode.

The evaporator 12 operates together with a compressor 23, a condenser 24, a liquid tank 25 and an expansion valve 26 to establish a cooling cycle. The compressor 23 is connected with the vehicle engine 28 through a magnetic clutch 27. The actuators 10, 15 and 22, the motor 11M of the blower 11 and the clutch solenoid 27M of the magnetic clutch 27 are controlled by the control unit 4.

The control unit 4, which is constituted mainly of a microcomputer, produces control signals which it outputs to the actuators 10, 15 and 22, the motor 11M of the blower 11 and the clutch solenoid 27M of the magnetic clutch 27 through corresponding drive circuits 40a–40e.

Reference numeral 29 in FIG. 1 designates a passenger compartment temperature sensor for detecting the temperature in the passenger compartment 20, 30 an outside air temperature sensor located at an appropriate place in the vehicle engine compartment for detecting the outside temperature, 31 a duct temperature sensor for detecting the temperature of the air in the duct 5 immediately after it has passed through the evaporator 12, 32 a sunlight intensity sensor, and 33 a coolant temperature sensor for detecting the coolant temperature of the engine 28. The signals output by the sensors 29–32 and the air mixing door potentiometer 16 are selected by a multiplexer 34 and each selected signal is converted to a digital signal by an A/D converter 35 and input to the control unit 4.

The control unit 4 also receives a signal S from the operation panel 3. The operation panel 3 receives display data from the control unit 4 through a display signal processing circuit 36 and uses the display data to display the blower speed, air flow distribution mode, temperature setting, outside temperature and the like, as explained further later.

Figure 2:
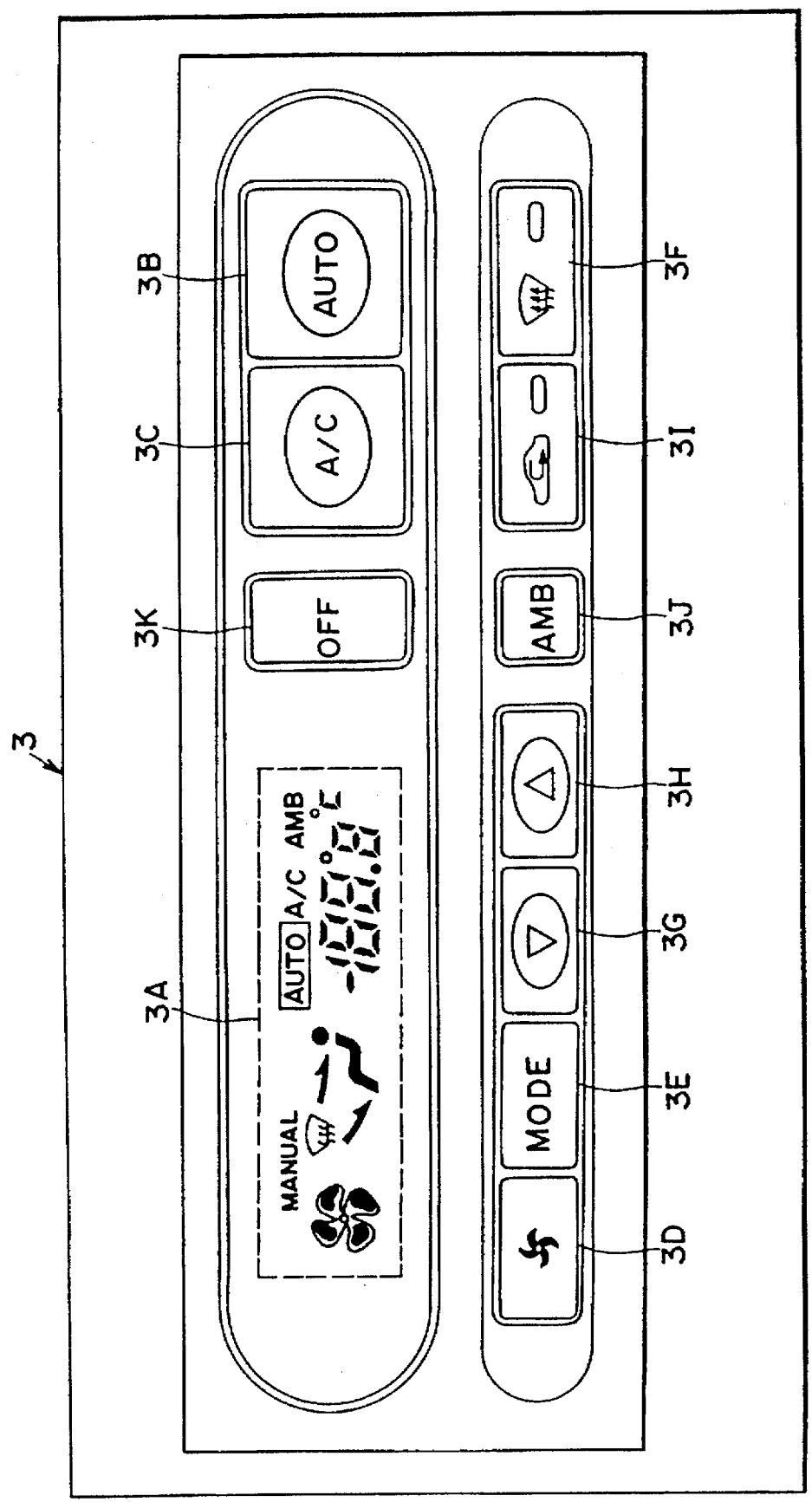
FIG. 2 is an enlarged front view of the operation panel shown in FIG. 1.

FIG. 2 is an enlarged view of the operation panel 3 shown in FIG. 1. The operation panel 3 is of conventional configuration. Reference symbol 3A in FIG. 2 designates a display for displaying various settings, 3B an AUTO switch for starting automatic control of the vehicle air-conditioning system 1. Pressing the AUTO switch 3B turns on the compressor 23. Reference symbol 3C designates an A/C switch for on/off controlling the compressor 23. After the AUTO switch 3B has once been pressed, pressing the A/C switch 3C turns off the A/C indication and on the display 3A and turns off only the compressor 23. Pressing the A/C switch 3C a second time relights the A/C indication and turns the compressor 23 back on. In other words, repeatedly pressing the A/C switch 3C toggles the compressor 23 on and off.

Reference symbol 3D designates a fan switch. After the AUTO switch 3B has once been pressed, pressing the fan switch 3D turns off the AUTO indication and lights the MANUAL indication on the display 3A. When the system is not in AUTO mode, pressing the fan switch 3D displays the temperature setting, air outlet and current fan speed on the display 3A and also lights the MANUAL indication. Successively pressing the fan switch 3D cycles the fan speed through four stages, enabling selection of a first, second, third or fourth speed. Reference symbol 3E designates a MODE switch. The air outlet changes each time the MODE switch 3E is pressed. Reference symbol 3F is a DEF switch for switching the air flow to the defroster (DEF) outlet. All of the switches 3B–3F are momentary switches whose contacts close (on state) when pressed by the operator and open (off state) when released by the operator. This type of switch is also referred to as a touch switch.

Reference symbol 3G is a temperature decrease switch (temp-down switch) for lowering the temperature setting and 3H is a temperature increase switch (temp-up switch) for raising the temperature setting. The temp-down switch 3G and the temp-up switch 3H are both momentary switches. The contact information from the switches 3G and 3H is processed by the control unit 4 so as to lower the temperature setting by 0.5° C. when the temp-down switch 3G is pressed once for a short period of time and to raise the temperature setting by 0.5° C. when the temp-up switch 3H is pressed once for a short period of time. When the temp-down switch 3G is held down for longer than a prescribed time period (0.5 sec in this embodiment), i.e., when the on state of the temp-down switch 3G continues for longer than the prescribed time period, the setting mode changes to one in which the temperature setting decreases 0.5° C. once every prescribed time interval. Similarly, when the temp-up switch 3H is held down for longer than the prescribed time period, i.e., when the on state of the temp-up switch 3H continues for longer than the prescribed time period, the setting mode changes to one in which the temperature setting increases 0.5° C. once every prescribed time interval. The desired temperature setting can be selected in the prescribed increments in the range between 18°–32° C. by utilizing the aforesaid functions of the temp-down switch G and the temp-up switch 3H.

Reference symbol 3I designates a REC switch. Pressing the REC switch 3I toggles the system between automatic control and recirculation of inside air. Reference symbol 3J designates an AMB switch for displaying the ambient air temperature outside the passenger compartment on the display 3A. Pressing the AMB switch 3J lights the AMB indication on the display 3A and simultaneously digitally displays the ambient (outside) air temperature thereon. Reference symbol 3K is an OFF switch for turning off the supply of power to the vehicle air-conditioning system 1. The switches 3I–3K are momentary switches.

Since the configuration of the operation panel 3 using momentary switches in the foregoing manner and the aforesaid control conducted in response to the contact information from the momentary switches of the operation panel 3 are both known to the art, the data processing for the control will not be explained in detail here.

The control unit 4 will now be explained with reference to FIGS. 3 to 6.

Figure 3:
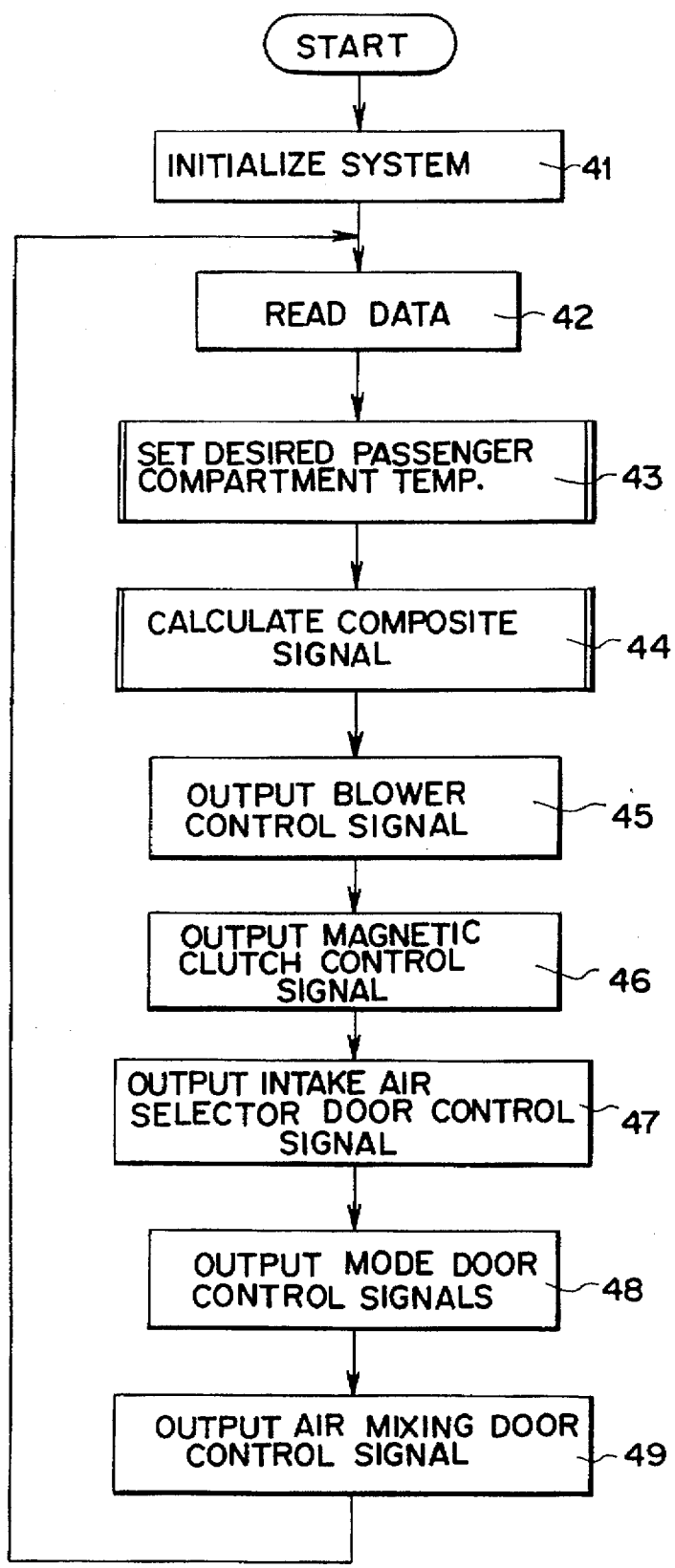
FIG. 3 is a flow chart showing a control program executed by a microcomputer in the control unit shown in FIG. 1.

FIG. 3 is a flow chart showing a control program loaded beforehand into a memory of a microcomputer (not shown) included in the control unit 4. The execution of this control program is started when power is first supplied to the vehicle air-conditioning system 1 at the time the ignition switch (not shown) of the vehicle is turned on. The program starts with step 41 in which initialization processing is conducted and then moves to step 42 in which the signal S including the contact information from the operation switches is read in from the operation panel 3 and the information from the sensors is read in through the multiplexer 34 and the A/D converter 35. The desired passenger compartment temperature is then set in step 43.

Figure 4:
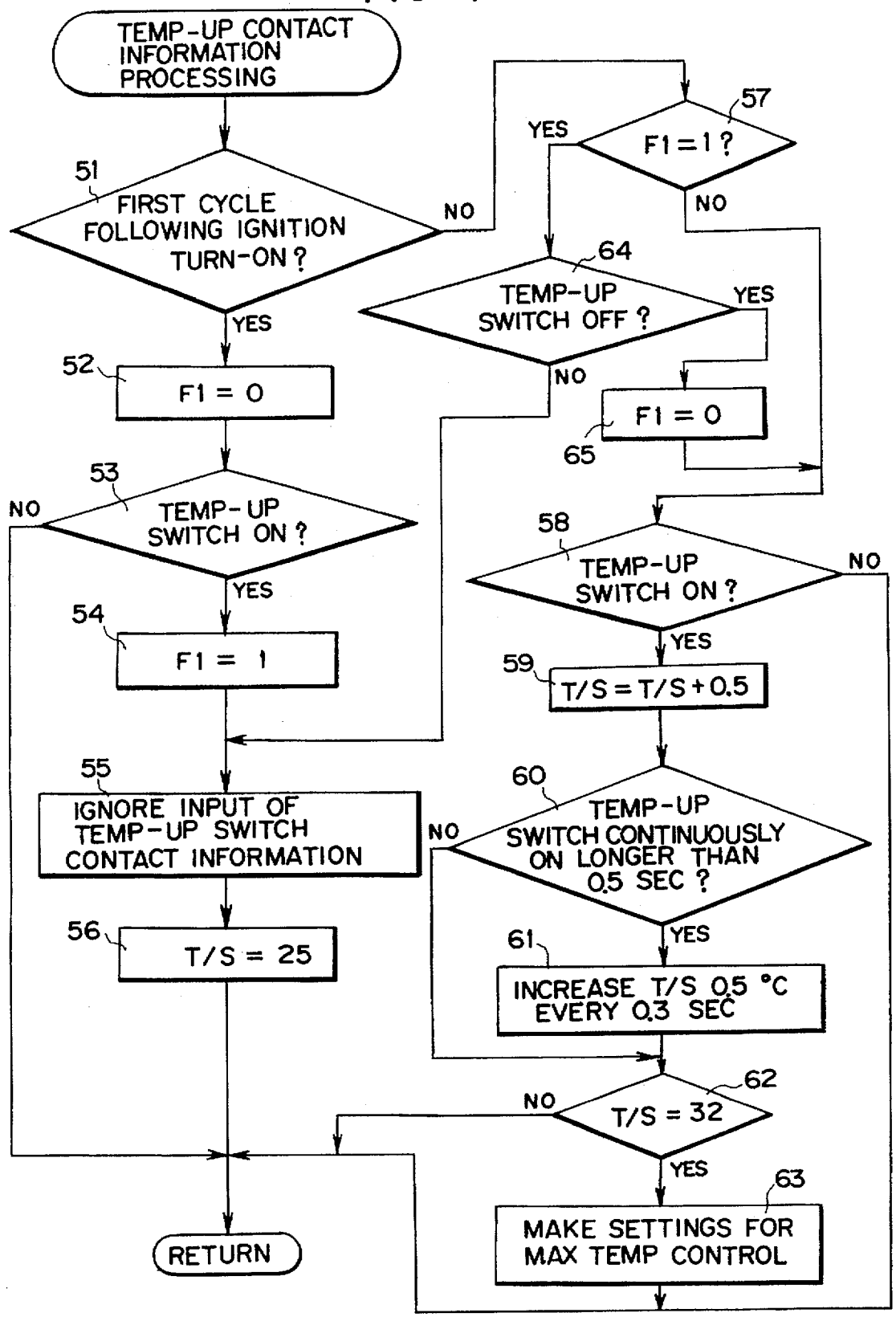
FIG. 4 is a flow chart showing the particulars of temperature increase switch information processing conducted in the step of the flow chart of FIG. 3 for setting the desired passenger compartment temperature.
Figure 5:
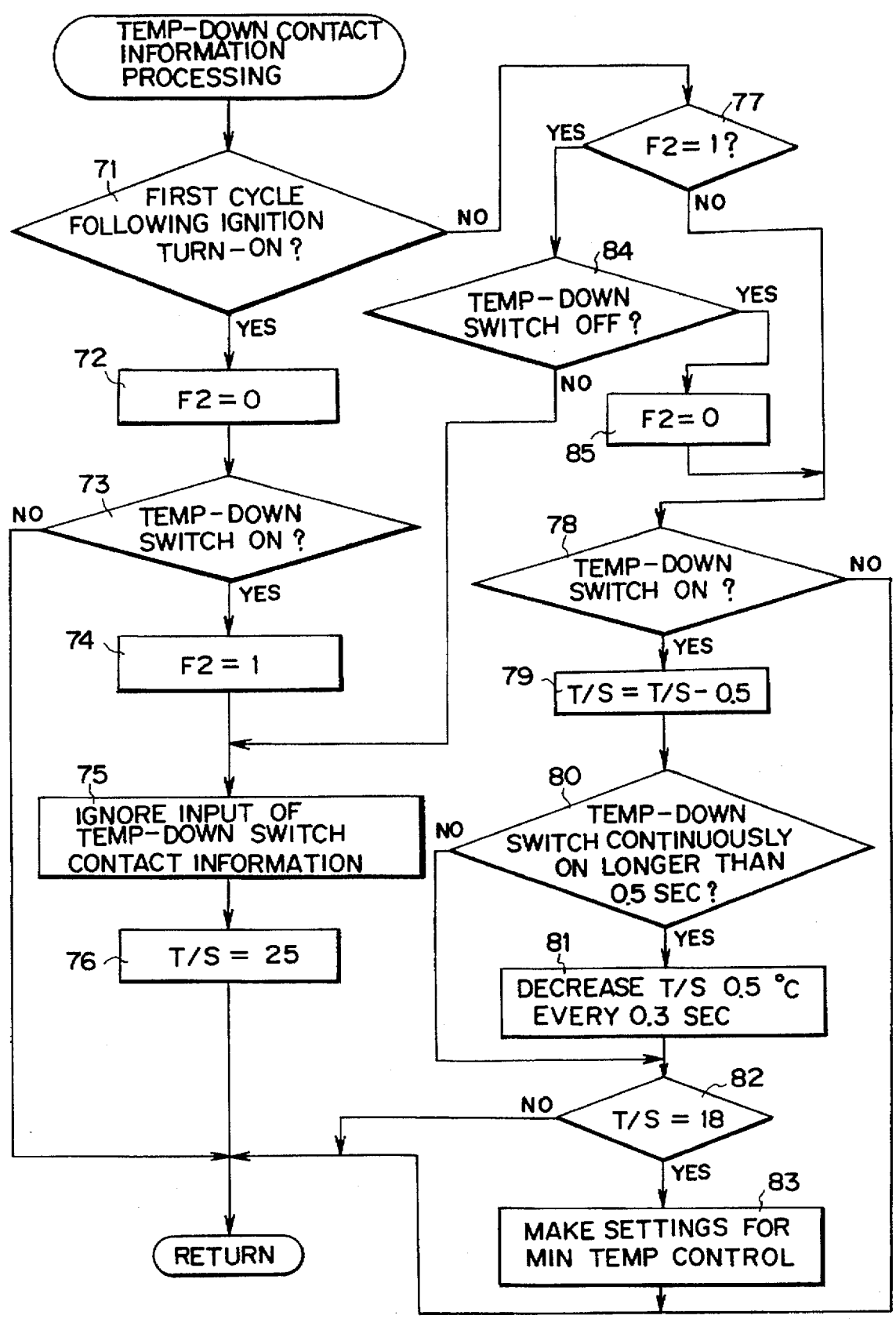
FIG. 5 is a flow chart showing the details of temperature decrease switch information processing conducted in the step of the flow chart of FIG. 3 for setting the desired passenger compartment temperature.

The setting of the desired temperature in step 43 will be explained with reference to FIGS. 4 and 5, starting with an explanation with reference to FIG. 4 of the processing of the contact information from the temp-up switch 3H. After the temp-up switch contact information processing of FIG. 4 has been initiated in accordance with a prescribed procedure, a discrimination is made in step 51 as to whether or not this is the first cycle after the ignition switch was turned on. When the result in step 51 is YES, a flag F1 for indicating malfunction of the temp-up switch 3H is reset in step 52 and it is discriminated whether the temp-up switch 3H is on at this time in step 53. Since the temp-up switch 3H is a momentary switch, it is normally off at the time point when the ignition switch is turned on. Normally, therefore, the result in step 53 is NO and the current cycle of temp-up switch contact information processing is terminated.

On the other hand, when the temp-up switch 3H is on at the time the ignition switch is turned on, owing to sticking of its contacts in shorted contact, for example, the result of the discrimination in step 53 becomes YES and the flag F1 is set in step 54. Next, in step 55, input of the contact information from the temp-up switch 3H is ignored and the setting T/S indicating the desired passenger compartment temperature is set to 25° C. in step 56. In other words, when the temp-up switch 3H is found to be already on at the time the ignition switch is turned on, the temp-up switch 3H is assumed to be faulty, the input of contact information from the temp-up switch 3H is ignored, the desired passenger compartment temperature is forced to 25° C., the predefined initial state, and the current cycle of temp-up switch contact information processing is terminated.

When the result of the discrimination in step 51 is NO, i.e., when this is not the first cycle after the ignition switch was turned on, control passes to step 57, in which it is discriminated whether the flag F1 is set to 1. When it is not, i.e., when it was found that the temp-up switch 3H is not faulty, a discrimination is made in step 58 as to whether the temp-up switch 3H is on. When it is not, the result in step 58 is NO and the current cycle of temp-up switch contact information processing is terminated.

When the temp-up switch 3H is being pressed, the result in step 58 is YES and 0.5° C. is added to the desired passenger compartment temperature setting T/S in step 59 to obtain a new temperature setting T/S. Next, in step 60, it is discriminated whether the temp-up switch 3H has been continuously depressed for more than 0.5 sec. When the result in step 60 is YES, the setting T/S is increased in increments of 0.5° C. once every 0.3 sec in step 61.

When the processing of step 61 has been completed or when the result in step 60 is NO, control passes to step 62, where it is discriminated whether the setting T/S is 32° C., the maximum temperature setting. When the setting T/S is not 32° C., the result in step 62 is NO and the current cycle of temp-up switch contact information processing is terminated. On the other hand, when step 62 finds that the setting T/S is 32° C., the result in step 62 is YES and control passes to step 63, where prescribed settings are made for maximum temperature control. The settings for maximum temperature control may, for example, consist of setting the air mixing door 14 to the hottest position, setting the blower 11 to maximum speed, setting the magnetic clutch 27 to off so as to stop the operation of the compressor 23, and setting the intake air selector door 9 to the position for sucking in outside air. When execution of step 63 has been completed, the current cycle of temp-up switch contact information processing is terminated.

When the result in step 57 is YES, control passes to step 64, where it is discriminated whether the temp-up switch 3H is off. When it is, the flag F1 is reset in step 65, whereafter step 58 and the following steps are executed, i.e., control for the case that the temp-up switch 3H is not faulty is conducted. On the other hand, when step 64 does not find the temp-up switch 3H to be off, the result in step 64 is NO and control passes to step 55 and the processing of steps 55 and 56 for the case that the temp-up switch 3H is faulty is conducted as explained earlier.

The processing of the contact information from the temp-down switch 3G will now be explained with reference to FIG. 5. After the temp-down switch contact information processing of FIG. 5 has been initiated in accordance with a prescribed procedure, a discrimination is made in step 71 as to whether or not this is the first cycle after the ignition switch was turned on. When the result in step 71 is YES, a flag F2 for indicating malfunction of the temp-down switch 3G is reset in step 72 and it is discriminated whether the temp-down switch 3G is on at this time in step 73. Since the temp-down switch 3G is a momentary switch, it is normally off at the time point when the ignition switch is turned on. Normally, therefore, the result in step 73 is NO and the current cycle of temp-down switch contact information processing is terminated.

On the other hand, when the temp-down switch 3G is on at the time the ignition switch is turned on, owing to sticking of its contacts in shorted contact, for example, the result of the discrimination in step 73 becomes YES and the flag F2 is set in step 74. Next, in step 75, input of the contact information from the temp-down switch 3G is ignored and the setting T/S indicating the desired passenger compartment temperature is set to 25° C. in step 76. In other words, when the temp-down switch 3G is found to be already on at the time the ignition switch is turned on, the temp-down switch 3G is assumed to be faulty, the input of contact information from the temp-down switch 3G is ignored, the desired passenger compartment temperature is forced to 25° C., the predefined initial state, and the current cycle of temp-down switch contact information processing is terminated.

When the result of the discrimination in step 71 is NO, i.e., when this is not the first cycle after the ignition switch was turned on, control passes to step 77, in which it is discriminated whether the flag F2 is set to 1. When it is not, i.e., when it was found that the temp-down switch 3G is not faulty, a discrimination is made in step 78 as to whether the temp-down switch 3G is on. When it is not, the result in step 78 is NO and the current cycle of temp-down switch contact information processing is terminated.

When the temp-down switch 3G is being pressed, the result in step 78 is YES and 0.5° C. is subtracted from the desired passenger compartment temperature setting T/S in step 79 to obtain a new temperature setting T/S. Next, in step 80, it is discriminated whether the temp-down switch 3G has been continuously depressed for more than 0.5 sec. When the result in step 80 is YES, the setting T/S is decreased in increments of 0.5° C. once every 0.3 sec in step 81.

When the processing of step 81 has been completed or when the result in step 80 is NO, control passes to step 82, where it is discriminated whether the setting T/S is 18 ° C., the minimum temperature setting. When the setting T/S is not 18° C., the result in step 82 is NO and the current cycle of temp-down switch contact information processing is terminated. On the other hand, when step 82 finds that the setting T/S is 18° C., the result in step 82 is YES and control passes to step 83, where prescribed settings are made for minimum temperature control. The settings for minimum temperature control may, for example, consist of setting the air mixing door 14 to the coolest position, setting the blower 11 to maximum speed, setting the magnetic clutch 27 to on so as to operate the compressor 23, and setting the intake air selector door 9 to the position for recirculating inside air. When execution of step 83 has been completed, the current cycle of temp-down switch contact information processing is terminated.

When the result in step 77 is YES, control passes to step 84, where it is discriminated whether the temp-down switch 3G is off. When it is, the flag F2 is reset in step 85, whereafter step 78 and the following steps are executed, i.e., control for the case that the temp-down switch 3G is not faulty is conducted. On the other hand, when step 84 does not find the temp-down switch 3G to be off, the result in step 84 is NO and control passes to step 75 and the processing of steps 75 and 76 for the case that the temp-down switch 3G is faulty is conducted as explained earlier.

As is clear from the foregoing explanation, the fetching of the contact information from the temp-down switch 3G and the temp-up switch 3H for use in setting the desired passenger compartment temperature is accompanied by a check to determine whether one or both of the switches 3G and 3H was on at the time the vehicle ignition switch was switched from off to on, and if one or both is found to have been on at this time, the contact information from the switch or switches that were on is invalidated and a predefined initial state (state in which the desired passenger compartment temperature is set to 25° C. in this embodiment) is implemented.

Returning to FIG. 3, after the setting of the desired passenger compartment temperature has been set in the foregoing manner in step 43, a composite signal is calculated in step 44.

As shown in FIG. 6, the calculation of the composite signal is conducted in step 44 by correcting the desired passenger compartment temperature setting T/S based on an outside temperature value for control purposes TaD, thereby obtaining an outside-temperature corrected temperature setting T'$_{SET}$, and using the setting T'$_{SET}$ to calculate the composite signal T in accordance with the equation shown in FIG. 6. As the calculation of the composite signal T as shown in FIG. 6 is known to the art, it will not be explained further here.

Upon completion of the calculation in step 44 in FIG. 3, a control signal for the blower 11 is calculated and output in step 45, a control signal for the magnetic clutch 27 is calculated and output in step 46, a control signal for the intake air selector door 9 is calculated and output in step 47, and control signals for the mode doors 21a, 21b and 21c are calculated and output in step 48. An air mixing door control signal for controlling the position of the air mixing door 14 is calculated and output in step 49 based on the value of the composite signal T calculated in step 44.

The control signals output by the control unit 4 in this manner are supplied to the associated drive circuits 40a–40e to control the blower 11, magnetic clutch 27, intake air selector door 9, mode doors 21a, 21b and 21c and air mixing door 14 in accordance with the corresponding control signals, thereby maintaining the temperature of the passenger compartment 20 at the current desired passenger compartment temperature.

Insofar as shorted contact sticking does not occur in either the temp-down switch 3G or the temp-up switch 3H, the aforesaid configuration enables the desired passenger compartment temperature to be freely set by use of the switches 3G and 3H and controls the various system components so as to maintain the temperature of the passenger compartment 20 at the set temperature. On the other hand, when it is discriminated that the contacts of one or both of the temp-down switch 3G and the temp-up switch 3H have stuck in shorted contact, the input of contact information from the switch or switches whose contacts were found to have stuck is ignored and the operating state is automatically set to the initial state, in which the desired passenger compartment temperature is set to 25° C.

Therefore, when one switch between the temp-down switch 3G and the temp-up switch 3H has incurred shorted contact sticking and the other has not, the desired passenger compartment temperature is automatically set to 25° C., but this temperature setting can be either raised or lowered depending on which of the switches has not incurred shorted contact sticking. In this embodiment, moreover, when flag F1 or F2 is found to be set to 1 in a processing cycle other than the first one after the ignition switch was turned on, a check is made (in step 64 or 84) as to whether the temp-up switch or temp-down switch is off and normal control is restored at the time point when the switch contact problem ceases to exist, thus enhancing user friendliness of the system.

In the foregoing embodiment, the initial state is defined as one in which the desired passenger compartment temperature is set to 25°C. The invention is not limited to the configuration of this embodiment, however, and it is instead possible, for example, to define the initial state as one in which the desired passenger compartment temperature is set to a value at the middle point of the setting range or to some other appropriate value. Also, since the embodiment described above uses a computer control program to achieve the required functions, it can be applied to existing systems with no increase in cost.

The invention has been explained with reference to an embodiment aimed at mitigating problems arising due to faulty temp-up and/or temp-down switches. The invention is not, however, limited to the configuration of this embodiment. For example, this invention can also be applied to a vehicle air-conditioning system which uses a momentary switch as the fan switch and is configured to respond to maintenance of the fan switch in the on state for more than a prescribed period of time by linearly oscillating the blow rate of the fan between Low and High so long as the switch remains on. In this case, a configuration can be adopted in which the fan switch is checked for shorted contact sticking at the time the vehicle ignition switch is turned on. When sticking is discovered, the contact information from the fan switch is invalidated and the fan blow rate is set to an initial state, namely, a state in which the fan blow rate is set to an intermediate value between Low and High.

This invention can also be applied to a vehicle air-conditioning system which uses a momentary switch as the mode switch and is configured to respond to maintenance of the mode switch in the on state for more than a prescribed period of time by cyclically varying the air flow distribution mode so long as the switch remains on. In this case, a configuration can be adopted in which the mode switch is checked for shorted contact sticking at the time the vehicle ignition switch is turned on and when sticking is discovered, the contact information from the mode switch is invalidated and the air flow distribution mode is set to an initial state, namely, to a state in which the air flow distribution mode is set to a predefined mode, for example, to vent mode. In addition, this invention can be applied to a vehicle air-conditioning system which uses a momentary switch as the REC switch and is configured to respond to maintenance of the REC switch in the on state for more than a prescribed period of time by cyclically varying the air intake mode so long as the switch remains on. In this case, a configuration can be adopted in which the REC switch is checked for shorted contact sticking at the time the vehicle ignition switch is turned on and when sticking is discovered, the contact information from the REC switch is invalidated and the air intake mode is set to an initial state, namely, to a state in which the air intake mode is set to a predefined mode, for example, to the outside air intake mode.

Further, this invention can be applied to a vehicle air-conditioning system which uses a momentary switch as the A/C switch and is configured to respond to maintenance of the A/C switch in the on state for more than a prescribed period of time by toggling the compressor on and off so long as the switch remains on. In this case, a configuration can be adopted in which the A/C switch is checked for shorted contact sticking at the time the vehicle ignition switch is turned on and when sticking is discovered, the contact information from the A/C switch is invalidated and an initial state is set in which, for example, the compressor is on.

In any of the aforesaid configurations, the invention can be further configured such that when the vehicle ignition switch was turned off with a momentary switch subject to fault discrimination held in the on state, the contact information from the momentary switch concerned is not invalidated but is fetched and used for air-conditioning control irrespective of whether or not the momentary switch concerned is faulty.

What is claimed is:

1. A vehicle air-conditioning system comprising
   an air conditioner operation panel equipped with one or more momentary switches,
   a control unit responsive to at least contact information from the momentary switches for outputting a control signal for air conditioning control,
   a main air-conditioning system unit which operates in response to the control signal, discriminating means for discriminating whether or not any momentary switch is on at system power-up, and initialization means for setting the system to a predefined initial control state when the discriminating means discriminates that at least one momentary switch is on.

2. A vehicle air-conditioning system as claimed in claim 1, wherein the momentary switches are a temp-down switch and a temp-up switch for changing a set temperature.

3. A vehicle air-conditioning system as claimed in claim 2, wherein the initial control state is a state in which the temperature setting is near the middle of a range of settable temperatures.

4. A vehicle air-conditioning system 1 as claimed in claim 1, further comprising a second discriminating means for discriminating whether or not a momentary switch once discriminated to be on by the discriminating means has since gone off and means for discontinuing the predefined initial control state set by the initialization means when the second discrimination means discriminates that the momentary switch has gone off, the main air-conditioning unit being controlled in response to contact information from the momentary switch after the discrimination that the momentary switch has gone off.

5. A vehicle air-conditioning system as claimed in claim 1, wherein the momentary switch is a fan speed switch for setting fan speed, fan blow rate being set to a predefined value when the discriminating means discriminates that the fan switch is on at the time of system power-up.

6. A vehicle air-conditioning system as claimed in claim 1, wherein the momentary switch is a mode switch for setting air flow distribution mode, air flow distribution mode being set to a predefined initial state when the discriminating means discriminates that the mode switch is on at the time of system power-up.

7. A vehicle air-conditioning system as claimed in claim 1, wherein the momentary switch is an air intake mode selector switch for setting air intake mode, air intake mode being set to a predefined initial state when the discriminating means discriminates that the air intake mode selector switch is on at the time of system power-up.

8. A vehicle air-conditioning system as claimed in claim 1, wherein the momentary switch is an A/C switch for turning on a compressor, the compressor being turned on when the discriminating means discriminates that the A/C switch is on at the time of system power-up.

9. A method of controlling a vehicle air-conditioning system including a main air-conditioning system unit and an air-conditioner operation panel equipped with one or more momentary switches, wherein the main air-conditioning system unit is controlled by an air-conditioning control signal output in response to at least contact information from the momentary switches, the method comprising the step of discriminating whether or not any momentary switch is on at system power-up and the step of setting the system to a predefined initial control state independent of contact information from such momentary switch or switches when at least one momentary switch is discriminated to be on.

10. A method as claimed in claim 9, wherein the momentary switches are a temp-down switch and a temp-up switch for changing a set temperature.

11. A method as claimed in claim 10, wherein the initial control state is a state in which the set temperature is near the middle of a range of settable temperatures.

12. A method as claimed in claim 9, further comprising a second discriminating step for discriminating whether or not a momentary switch once discriminated to be on in the discriminating step has since gone off and a step for discontinuing the predefined initial control state and setting the system to be controlled in response to contact information from the momentary switch when the second discriminating step discriminates that the momentary switch has gone off.

* * * * *